UNITED STATES PATENT OFFICE.

HEINRICH F. D. SCHWAHN, OF KANSAS CITY, MISSOURI.

PROCESS OF PURIFYING NATIVE SULFATE OF BARIUM.

SPECIFICATION forming part of Letters Patent No. 514,040, dated February 6, 1894.

Application filed February 23, 1893. Serial No. 463,452. (No specimens.)

*To all whom it may concern:*

Be it known that I, HEINRICH F. D. SCHWAHN, a citizen of the United States, residing at Kansas City, in the county of Jackson and State of Missouri, have invented a certain new and useful Improved Process of Purifying Natural Sulfate of Barium from Iron, &c., of which the following is a full, clear, and exact description.

The invention consists in a process with certain features of novelty hereinafter described and pointed out in the claims by which sulfate of barium may be obtained free of iron and other impurities, to be used as an improved pigment or for other industrial purposes.

In carrying out my process I first use a compound of nitric acid and hydro-chloric acid to be mixed with the said natural sulfate of barium, to which mixture then sulfuric acid is added. The nitro-hydro-chloric and sulphuric acids react upon each other and the ore, and a double decomposition takes place which decomposition is improved by the application of moderate heat; the iron intermixed with the sulfate of barium has been changed into ferric-chlorid. By further heating of the mass the ferric-chlorid will escape as fumes with the waste hydro-chloric and nitric acids, &c. The hydro-chloric and nitric acids of commerce are mixed in the ratio of about one part of nitric acid to about two parts of hydrochloric acid, and to which I use about one and one-half part sulfuric acid preferably of 66° Baumé to produce the reactions, and I employ said acids in about such quantities as are necessary to convert all the iron intermixed with the sulfate of barium into ferric-chlorid, and which has to be ascertained first by analysis or experiment but in general about one-half pound of nitric acid and about one pound of hydro-chloric acid, preferably diluted with about ten pounds of water, and about one and one-half pound of sulfuric acid are sufficient quantities for one-hundred pounds of sulfate of barium; but instead of using already-made hydro-chloric and nitric acids of commerce as above described, I mix the crude material therefor with the sulfate of barium to produce said nitric and hydrochloric acids, namely, nitrate of sodium or potassium (saltpeter) and chlorid of sodium (common salt) and decompose them with sulfuric acid as above. The reason I make this variation is for cheapening and improving the process as the hydro-chloric and nitric acids are in this way applied in their nascent condition, which will improve the reactions, and which variation of applying these acids is in some cases absolutely necessary to make a perfect decomposition especially if the ore is highly loaded with impurities other than iron, but the essential parts of the process are the same as above stated. I therefore add to the said sulfate of barium a sufficient quantity of chlorid of sodium (common salt) and nitrate of potassium or sodium (saltpeter) and water to deliver if decomposed by sulfuric acid added thereto, the necessary amount of nitric and hydro-chloric acids. I therefore add so much of chlorid of sodium and nitrate as seems necessary to produce by the addition of a certain quantity of sulfuric acid the above corresponding amount of hydro-chloric and nitric acids and the necessary reaction to follow. The resulting sulfate of sodium or potassium from the decomposed chlorid of sodium and nitrate can be separated by washing and recovered as by-product. The crude material to produce said nitric and hydrochloric acids I preferably add in form of a solution to the ore and I add the material in the ratio of about two pounds of chlorid of sodium, about one pound of nitrate, about ten pounds of water and about three pounds of sulfuric acid preferably of 66° Baumé to one-hundred pounds of sulfate of barium and these given quantities are in general sufficient.

The mode of operation is the same in either case whether I employ the ready-made acids of commerce or the crude material therefor to produce the said acids, and I take the sulfate of barium as it is found in nature as an ore and wash it to separate the earthy matters. Then I roast it in a kiln without exposing to the open fire, and grind it still hot, to a fine powder. Then I place the powdered mass preferably in a closed receptacle provided with a stirring arrangement and mix therewith the hydro-chloric and nitric acids or the crude material therefor and to this mixture I add then under constant stirring the sulfuric acid. The resulting gases I preferably confine within the receptacle to be absorbed by the mass which should be soft like mortar, and therefore the quantity of water to be added must be regulated accordingly. Then I apply very moderate heat to the mass now pink colored, which color is changed by the heat into yellowish green, and the heating, now by moderate heat, is continued, therewith evaporating the volatile ferric-chlorid with the waste hydro-chloric and nitric acids until the mass is perfectly white and then I expose the mass so long to heat which can be raised to a certain extent until if tested by litmus paper, it will indicate no acid, or as soon as white I lixiviate and wash the mass preferably with pure water to separate the acid left and other impurities which may have been contained in or admixed with the ore, like sulfate of sodium or potassium resulting from the decomposed chlorid of sodium or nitrate, &c.

Having thus fully described my invention, I claim as new and desire to secure by Letters Patent—

1. The improvement in the art of purifying natural sulfate of barium, consisting in roasting and grinding the ore containing the sulfate of barium, and mixing the same with hydro-chloric and nitric acids, then adding sulfuric acid to the resulting mixture and heating the same, then washing and floating, substantially as and for the purpose set forth.

2. The improved process of purifying natural sulfate of barium from iron &c., consisting in roasting and grinding the ores containing the sulfate of barium, then mixing with the same hydro-chloric and nitric acids or the crude material therefor to produce the same, namely, chlorid of sodium and nitrate of sodium or potassium; then adding to the resulting mixture sulfuric acid, then heating of the decomposed mass and evaporating and expelling of the waste hydro-chloric and nitric acids and produced ferric-chlorid, then washing and floating, substantially as and for the purpose set forth.

3. The improved process of purifying natural sulfate of barium from iron &c., consisting, in roasting and grinding the ores containing the sulfate of barium, then treating the same with nitric, hydro-chloric and sulfuric acids in the manner as specified; then expelling and evaporating of the produced ferric-chlorid and waste acids by heating the resulting decomposed mass, all as set forth.

HEINRICH F. D. SCHWAHN.

Witnesses:
HENRY STUBENRAUCH,
SAMUEL W. DUNNING.